Patented Sept. 20, 1927.

1,643,251

UNITED STATES PATENT OFFICE.

GEORGE A. McBRIDE, OF SEATTLE, WASHINGTON.

COMPOSITION FOR CLEANING AND POLISHING GLASS.

No Drawing.  Application filed August 11, 1926. Serial No. 128,710.

My invention relates to a composition for cleaning and polishing glass, such as is found in various types of windows in buildings or boats, windshields of automobiles etc., and any form of glassware which is required to be cleaned and polished. The composition not only removes dirt, grease and other incrustations but also polishes the glass.

In preparing my composition use is made of the following ingredients in substantially the proportions indicated, although it is to be understood that these proportions may be varied within certain limits to suit the purpose for which the composition is to be applied:

|  | Per cent by weight. |
|---|---|
| Amyl acetate | 0.84 |
| Ammonium carbonate | .046 |
| Mineral oil, such as kerosene | 99.114 |
|  | 100.000 |

The ammonium carbonate and amyl acetate are added to the kerosene and the whole thoroughly mixed and permitted to stand for at least 96 hours or more, with or without agitation, before use. Ammonium carbonate is only slightly soluble in the mineral oil, such as kerosene, and the addition of the amyl acetate is to increase this solubility. The amyl acetate further acts as a medium tending to destroy the unpleasant odor of the kerosene. The proportion of the amyl acetate used should not be so great as to render the odor of the product objectionable from the odor of the amyl acetate itself, nor should the proportion of the amyl acetate be so great as to act as a paint or varnish remover from painted or varnished surfaces with which the cleaning and polishing composition might come in contact, either accidentally or designedly. The mineral oil in the form of kerosene acts as a cleaning and polishing agent, while the ammonium carbonate alleviates the tendency of the kerosene to leave the transparent surface of the glass blue or foggy. From the above it will appear that I may omit the amyl acetate with its corresponding function, but it is preferable to include it.

The composition is used by dampening a soft cloth with it and then lightly rubbing the glass surface to be cleaned with the dampened cloth. The glass surface is then wiped dry with a soft dry cloth, whereupon the glass assumes a perfectly clean and polished condition.

My composition contains no water and is therefore not subject to freezing action. It eliminates the use of cleaning powders which have the objection of accumulating powder, dust or stains on the wood work and sills. It contains no caustic and is, therefore, not harmful to delicately finished surfaces or to the skin of the hands. Being so easily applied it can reach seemingly inaccessible places and is therefore very useful in cleaning small panes of glass or glass panes of irregular shape. Since it does not contain any form of acid, it is not corrosive; and containing no poison its use is free from danger. Containing neither acid nor alkali it is particularly desirable, since it neither causes hang nails, skin rashes nor cracking of the hands. It cannot scratch because there is contained in it no form of abrasive. In use it is very economical, being applied only as a slight film by a cloth dampened with it; and is a great saver of time, since practically immediately after application the glass can be rubbed with a dry cloth to produce a clean, dry and polished surface. Glass cleaned with the composition tends to prevent the adherence of water from rain or snow, causing the rain or snow to be easily shed without sticking.

Having described my invention what I claim is:

1. A glass cleaning composition containing about .046% ammonium carbonate in combination with kerosene.

2. A liquid glass cleaning composition comprising kerosene, a small proportion of ammonium carbonate, and amyl acetate.

3. A glass cleaning composition comprising about 99.114% kerosene, about 0.046% ammonium carbonate, and about 0.84% amyl acetate.

4. A liquid glass cleaning composition comprising kerosene which when applied alone to glass tends to leave the surface with a blue or foggy appearance, and a small amount of ammonium carbonate.

5. A liquid detergent composition comprising a relatively light mineral oil which when applied alone to glass leaves the surface with a blue or foggy appearance and ammonium carbonate.

In testimony whereof I affix my signature.

GEORGE A. McBRIDE.